(12) United States Patent
Ying et al.

(10) Patent No.: US 11,416,062 B2
(45) Date of Patent: Aug. 16, 2022

(54) TERMINAL CONTROL METHOD AND TERMINAL

(71) Applicant: HUAWEI TECHNOLOGIES CO., LTD., Guangdong (CN)

(72) Inventors: Yunjian Ying, Shenzhen (CN); Yang Li, Hangzhou (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 88 days.

(21) Appl. No.: 16/047,673

(22) Filed: Jul. 27, 2018

(65) Prior Publication Data

US 2018/0373317 A1 Dec. 27, 2018

Related U.S. Application Data

(63) Continuation of application No. PCT/CN2017/072099, filed on Jan. 22, 2017.

(30) Foreign Application Priority Data

Jan. 29, 2016 (CN) .......................... 201610066615.3

(51) Int. Cl.
*G06F 1/3293* (2019.01)
*G06F 1/3231* (2019.01)
(Continued)

(52) U.S. Cl.
CPC .......... *G06F 1/3293* (2013.01); *G06F 1/3218* (2013.01); *G06F 1/3231* (2013.01);
(Continued)

(58) Field of Classification Search
CPC .... G06F 1/3293; G06F 1/3218; G06F 1/3231; G06F 1/3265; G06F 3/013;
(Continued)

(56) References Cited

U.S. PATENT DOCUMENTS 7,450,926 B2 11/2008 Chang et al.
2003/0122810 A1* 7/2003 Tsirkel ...................... G09G 3/20
345/207
(Continued)

FOREIGN PATENT DOCUMENTS

CN 1801132 A 7/2006
CN 102137178 B 7/2013
(Continued)

*Primary Examiner* — Jaweed A Abbaszadeh
*Assistant Examiner* — Hyun Soo Kim
(74) *Attorney, Agent, or Firm* — Womble Bond Dickinson (US) LLP

(57) ABSTRACT

This disclosure disclose a terminal control method and a terminal. The method may include: when detecting that the front-facing camera is in a low power consumption mode, sending, by the second processor, a first message to the first processor, where the first message indicates that the front-facing camera is in the low power consumption mode; after receiving the first message, controlling, by the first processor, the front-facing camera to collect a low-power-consumption-mode image in the low power consumption mode; receiving, by the first processor, the low-power-consumption-mode image and identifying whether there are a predetermined quantity of consecutive low-power-consumption-mode images that include preset characteristic information, where the preset characteristic information is characteristic information indicating that a user currently needs to use the terminal; and adjusting, by the first processor, brightness of a screen of the terminal according to an identification result.

10 Claims, 9 Drawing Sheets

(51) Int. Cl.
*G06F 1/3234* (2019.01)
*G06F 3/01* (2006.01)
*G09G 5/00* (2006.01)
*G06V 40/19* (2022.01)
*G06V 40/16* (2022.01)
*G06F 1/3218* (2019.01)

(52) U.S. Cl.
CPC ............ *G06F 1/3265* (2013.01); *G06F 3/013* (2013.01); *G06V 40/166* (2022.01); *G06V 40/19* (2022.01); *G09G 5/00* (2013.01); *G09G 2330/021* (2013.01); *G09G 2360/144* (2013.01)

(58) Field of Classification Search
CPC .. G06K 9/00255; G06K 9/00604; G09G 5/00; G09G 2330/021; G09G 2360/144
See application file for complete search history.

(56) References Cited

U.S. PATENT DOCUMENTS

| | | | | |
|---|---|---|---|---|
| 2009/0259865 | A1* | 10/2009 | Sheynblat | G06F 1/3203 713/323 |
| 2011/0007103 | A1* | 1/2011 | Han | G09G 3/3406 345/690 |
| 2011/0103643 | A1 | 5/2011 | Salsman et al. | |
| 2014/0059365 | A1* | 2/2014 | Heo | G06F 1/3209 713/320 |
| 2014/0075226 | A1 | 3/2014 | Heo et al. | |
| 2014/0149754 | A1* | 5/2014 | Silva | G06F 1/3212 713/300 |
| 2014/0208145 | A1* | 7/2014 | Piccolotto | G06F 1/3231 713/324 |
| 2014/0368626 | A1* | 12/2014 | John Archibald | H04N 5/23241 348/61 |
| 2016/0018872 | A1* | 1/2016 | Tu | G06F 1/3287 345/173 |
| 2016/0094814 | A1* | 3/2016 | Gousev | G06K 9/6267 348/143 |
| 2016/0373645 | A1* | 12/2016 | Lin | G06F 3/013 |

FOREIGN PATENT DOCUMENTS

| | | |
|---|---|---|
| CN | 103489429 A | 1/2014 |
| CN | 103516907 A | 1/2014 |
| CN | 104115485 A | 10/2014 |
| CN | 104468912 A | 3/2015 |
| CN | 104603716 A | 5/2015 |
| CN | 105759935 A | 7/2016 |
| WO | 2014124663 A1 | 8/2014 |

* cited by examiner

TERMINAL CONTROL METHOD AND TERMINAL

CROSS-REFERENCE TO RELATED APPLICATIONS

This application is a continuation of International Application No. PCT/CN2017/072099, filed on Jan. 22, 2017, which claims priority to Chinese Patent Application No. 201610066615.3, filed on Jan. 29, 2016. The disclosures of the aforementioned applications are hereby incorporated by reference in their entireties.

TECHNICAL FIELD

The present disclosure relates to the field of terminal technologies, and in particular, to a terminal control method and a terminal.

BACKGROUND

With rapid popularization of intelligent terminals, more people make or receive calls, send or receive SMS messages, surf the Internet, and use various application services by using intelligent terminals such as smartphones or tablet computers, so that the intelligent terminals become an indispensable part of people's life.

In the prior art, usually an intelligent terminal can work normally only when a processor is in a waking state. For example, when a mobile phone is in a standby state, the processor is in a sleep mode and a screen is in an off state. When a user needs to use the intelligent terminal, the user needs to press a power key or enter a related gesture to wake up the sleeping processor, so as to light up the screen of the terminal. This is complex and inconvenient for the user, and an intelligence effect is poor. In addition, some applications on the intelligent terminal are also restricted by the processor. For example, in the standby state, after the processor enters the sleep mode, a camera cannot work. To ensure that an application using the camera can work normally at any time, the user needs to keep the processor of the intelligent terminal in the waking state. This not only increases power consumption of the intelligent terminal but also greatly affects a battery life of the intelligent terminal.

SUMMARY

To resolve a technical problem, embodiments of the present disclosure provide a terminal control method and a terminal. According to the present disclosure, a prior-art technical problem that both intelligence and low power consumption of a terminal cannot be ensured can be resolved, so that user experience is improved.

According to a first aspect, an embodiment of the present disclosure provides a terminal control method, applied to a terminal including a first processor, a second processor, and a front-facing camera, where an operation processing capability of the first processor is lower than an operation processing capability of the second processor, and the method may include:

when detecting that the front-facing camera is in a low power consumption mode, sending, by the second processor, a first message to the first processor, where the first message indicates that the front-facing camera is in the low power consumption mode;

after receiving the first message, controlling, by the first processor, the front-facing camera to collect a low-power-consumption-mode image in the low power consumption mode;

receiving, by the first processor, the low-power-consumption-mode image and identifying whether there are a predetermined quantity of consecutive low-power-consumption-mode images that include preset characteristic information, where the preset characteristic information is characteristic information indicating that a user currently needs to use the terminal; and adjusting, by the first processor, brightness of a screen of the terminal according to an identification result.

According to the solution provided in this embodiment of the present disclosure, the first processor may intelligently and automatically adjust the brightness of the screen of the terminal according to the identification result of the image collected by the camera, without requiring the user to perform a manual operation. In addition, the first processor with relatively low power consumption controls the camera to collect the low-power-consumption-mode image, performs identification, and finally, directly controls or controls, by means of triggering, the brightness of the screen of the terminal, so that the second processor with relatively high power consumption is prevented from excessively participating in processes of image identification and intelligent control over the terminal, and power consumption of the terminal is reduced.

In one embodiment, the adjusting, by the first processor, brightness of a screen of the terminal according to an identification result includes:

calculating, by the first processor, a current ambient brightness value according to the low-power-consumption-mode image; and when the first processor receives the low-power-consumption-mode image and identifies that there are a predetermined quantity of consecutive low-power-consumption-mode images that include the preset characteristic information, and the first processor detects that the second processor is in a waking state and the screen of the terminal is in an on state, adjusting, by the first processor, the brightness of the screen of the terminal according to the ambient brightness value, where a larger ambient brightness value indicates higher adjusted brightness of the screen of the terminal.

According to the solution provided in this embodiment of the present disclosure, both intelligence and low power consumption of the terminal are ensured. In addition, the current ambient brightness value may be calculated according to the low-power-consumption-mode image, and the brightness of the screen of the terminal is adjusted intelligently, so that experience is improved when the user uses the terminal.

In one embodiment, the adjusting, by the first processor, brightness of a screen of the terminal according to an identification result includes:

controlling, by the first processor, the second processor to adjust the brightness of the screen of the terminal according to the identification result.

According to the solution provided in this embodiment of the present disclosure, the first processor instructs, by means of triggering, the second processor to adjust the brightness of the screen of the terminal according to the identification result. The first processor with low power consumption is used to perform identification and triggering actions, so as to ensure intelligence of the terminal and reduce power consumption, thereby improving user experience.

In one embodiment, the controlling, by the first processor, the second processor to adjust the brightness of the screen of the terminal according to the identification result includes:

when the first processor receives the low-power-consumption-mode image and identifies that there are a predetermined quantity of consecutive low-power-consumption-mode images that include the preset characteristic information, and the first processor detects that the second processor is in a sleep mode, waking up, by the first processor, the second processor and instructing the second processor to light up the screen of the terminal.

According to the solution provided in this embodiment of the present disclosure, when the first processor identifies that the user currently needs to use the terminal, and detects that the second processor is in the sleep mode, the first processor wakes up the second processor and instructs the second processor to light up the screen of the terminal, so as to intelligently meet a requirement of the user without a manual operation of the user, thereby improving user experience.

In one embodiment, the controlling, by the first processor, the second processor to adjust the brightness of the screen of the terminal according to the identification result includes:

when the first processor receives the low-power-consumption-mode image and identifies that there are a predetermined quantity of consecutive low-power-consumption-mode images that include the preset characteristic information, and the first processor detects that the second processor is in a waking state and the screen of the terminal is in an off state, instructing, by the first processor, the second processor to light up the screen of the terminal.

According to the solution provided in this embodiment of the present disclosure, when the first processor identifies that the user currently needs to use the terminal, and detects that the second processor is in the waking state and the screen is in the off state, the first processor instructs the second processor to light up the screen of the terminal, so as to intelligently meet a requirement of the user without a manual operation of the user, thereby improving user experience.

In one embodiment, the controlling, by the first processor, the second processor to adjust the brightness of the screen of the terminal according to the identification result includes:

when the first processor receives the low-power-consumption-mode image and identifies that no predetermined quantity of consecutive low-power-consumption-mode images include the preset characteristic information, and the first processor detects that the screen of the terminal is in an on state, instructing, by the first processor, the second processor to turn off the screen of the terminal.

According to the solution provided in this embodiment of the present disclosure, when identifying that the user currently does not need to use the terminal, and detecting that the screen is in the on state, the first processor instructs the second processor to turn off the screen of the terminal, so as to reduce power consumption of the terminal.

In one embodiment, the method further includes:
calculating, by the first processor, a current ambient brightness value according to the low-power-consumption-mode image; and
the instructing, by the first processor, the second processor to light up the screen of the terminal includes:
sending, by the first processor, the ambient brightness value to the second processor, and adjusting, by the second processor, the brightness of the screen of the terminal according to the ambient brightness value, where a larger ambient brightness value indicates higher adjusted brightness of the screen of the terminal.

According to the solution provided in this embodiment of the present disclosure, both intelligence and low power consumption of the terminal are ensured. In addition, the current ambient brightness value may be calculated according to the low-power-consumption-mode image, so that the brightness of the screen of the terminal is intelligently adjusted, and experience is further improved when the user uses the terminal.

In one embodiment, the method further includes:
when detecting that the front-facing camera switches from the low power consumption mode to a non-low power consumption mode, sending, by the second processor, a second message to the first processor, where the second message indicates that the front-facing camera switches to the non-low power consumption mode; and
after receiving the second message, stopping, by the first processor, controlling the front-facing camera, controlling, by the second processor, the front-facing camera to collect a non-low-power-consumption-mode image in the non-low power consumption mode, and performing, by the second processor, subsequent processing on the non-low-power-consumption-mode image.

According to the solution provided in this embodiment of the present disclosure, after detecting that a normal photographing function of the front-facing camera is enabled, the second processor controls the front-facing camera to collect and output the non-low-power-consumption-mode image with a frame rate or resolution higher than that of the low-power-consumption-mode image, so that the user can achieve a normal photographing effect when the user needs to use the photographing function of the front-facing camera. This not only implements a function of identifying the preset characteristic information by using the front-facing camera, but also retains and ensures a basic function of the front-facing camera serving as a camera sensor. In this way, both intelligence and low power consumption of the terminal are further ensured, and user experience is further improved.

In one embodiment, the first processor is a coprocessor, and the second processor is an application processor.

According to a second aspect, an embodiment of the present disclosure provides a terminal, which may include a first processor, a second processor, a front-facing camera, and a storage unit, where
an operation processing capability of the first processor is lower than an operation processing capability of the second processor, the storage unit is configured to store program code, and the second processor is configured to invoke the program code stored by the storage unit, to perform the following step: when it is detected that the front-facing camera is in a low power consumption mode, sending a first message to the first processor, where the first message indicates that the front-facing camera is in the low power consumption mode; and
the first processor is configured to invoke the program code stored by the storage unit, to perform the following steps: after the first message is received, controlling the front-facing camera to collect a low-power-consumption-mode image in the low power consumption mode; receiving the low-power-consumption-mode image and identifying whether there are a predetermined quantity of consecutive low-power-consumption-mode images that include preset characteristic information, where the preset characteristic information is characteristic information indicating that a user currently needs to use the terminal; and adjusting brightness of a screen of the terminal according to an identification result.

In one embodiment, the first processor is configured to:
calculate a current ambient brightness value according to the low-power-consumption-mode image; and
when receiving the low-power-consumption-mode image and identifying that there are a predetermined quantity of consecutive low-power-consumption-mode images that include the preset characteristic information, and detecting that the second processor is in a waking state and the screen of the terminal is in an on state, adjust the brightness of the screen of the terminal according to the ambient brightness value, where a larger ambient brightness value indicates higher adjusted brightness of the screen of the terminal.

In one embodiment, the first processor is configured to:
control, by the first processor, the second processor to adjust the brightness of the screen of the terminal according to the identification result.

In one embodiment, the first processor is configured to:
when receiving the low-power-consumption-mode image and identifying that there are a predetermined quantity of consecutive low-power-consumption-mode images that include the preset characteristic information, and detecting that the second processor is in a sleep mode, wake up, by the first processor, the second processor and instruct the second processor to light up the screen of the terminal.

In one embodiment, the first processor is configured to:
when receiving the low-power-consumption-mode image and identifying that there are a predetermined quantity of consecutive low-power-consumption-mode images that include the preset characteristic information, and detecting that the second processor is in a waking state and the screen of the terminal is in an off state, instruct, by the first processor, the second processor to light up the screen of the terminal.

In one embodiment, the first processor is configured to:
when receiving the low-power-consumption-mode image and identifying that no predetermined quantity of consecutive low-power-consumption-mode images include the preset characteristic information, and detecting that the screen of the terminal is in an on state, instruct the second processor to turn off the screen of the terminal.

In one embodiment, the first processor is further configured to calculate a current ambient brightness value according to the low-power-consumption-mode image;
the first processor is specifically configured to send the ambient brightness value to the second processor; and
the second processor is specifically configured to adjust the brightness of the screen of the terminal according to the ambient brightness value, where a larger ambient brightness value indicates higher adjusted brightness of the screen of the terminal.

In one embodiment, the second processor is further configured to: when detecting that the front-facing camera switches from the low power consumption mode to a non-low power consumption mode, send a second message to the first processor, where the second message indicates that the front-facing camera switches to the non-low power consumption mode;

the first processor is further configured to: after receiving the second message, stop controlling the front-facing camera; and
the second processor is further configured to: control the front-facing camera to collect a non-low-power-consumption-mode image in the non-low power consumption mode, and perform subsequent processing on the non-low-power-consumption-mode image.

In one embodiment, the first processor is a coprocessor, and the second processor is an application processor.

Implementation of the embodiments of present disclosure brings the following beneficial effects:

In the embodiments of the present disclosure, in the terminal including the first processor, the second processor, and the front-facing camera, the first processor with relatively low power consumption can control the front-facing camera to collect the low-power-consumption-mode image in the low power consumption mode, then, receive the low-power-consumption-mode image and identify whether there are a predetermined quantity of consecutive low-power-consumption-mode images that include the preset characteristic information, and finally, adjust the brightness of the screen of the terminal according to the identification result. Therefore, the processor may intelligently and automatically adjust the brightness of the screen of the terminal, without requiring the user to perform a manual operation. In addition, in this implementation, the first processor with relatively low power consumption controls the front-facing camera to collect the low-power-consumption-mode image, performs identification, and finally, adjusts the brightness of the screen of the terminal, so that the second processor with relatively high power consumption is prevented from excessively participating in brightness adjustment to the screen of the terminal, power consumption of the terminal is reduced, and a battery life is prolonged. That is, both intelligence and the battery life of the terminal can be ensured, great convenience is provided for the user during use of the terminal, and user experience is improved.

BRIEF DESCRIPTION OF DRAWINGS

To describe the technical solutions in the embodiments of the present disclosure more clearly, the following briefly describes the accompanying drawings required for describing the embodiments. Apparently, the accompanying drawings in the following description show merely some embodiments of the present disclosure, and persons of ordinary skill in the art may still derive other drawings from these accompanying drawings without creative efforts.

DESCRIPTION OF EMBODIMENTS

The following describes the embodiments of the present disclosure with reference to the accompanying drawings in the embodiments of the present disclosure.

Figure 1:
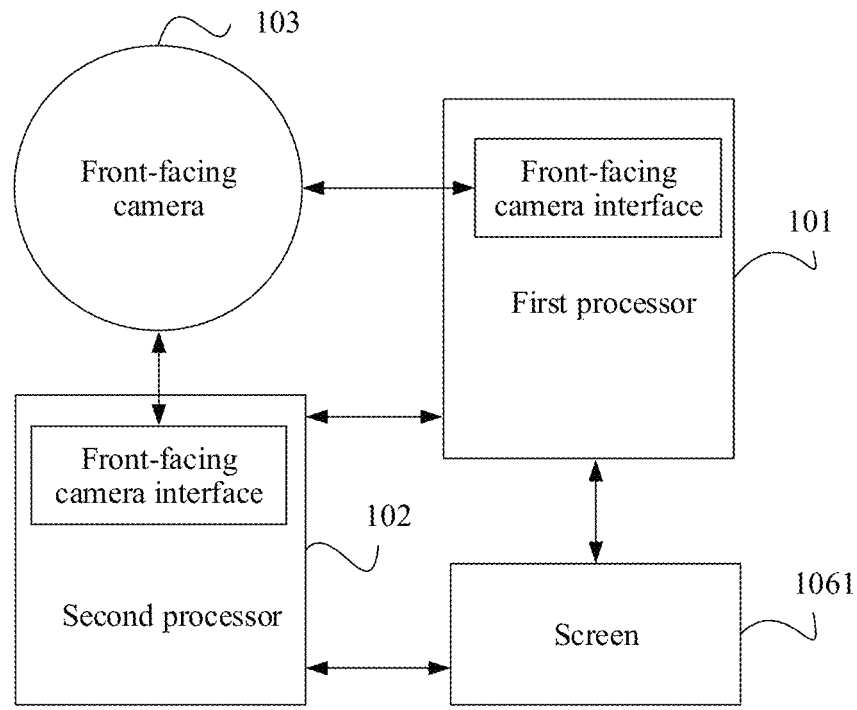
FIG. 1 is a schematic structural diagram of a terminal according to an embodiment of the present disclosure.

It should be noted that, a terminal control method in the present disclosure is applied to a terminal including a first processor, a second processor, and a front-facing camera. As shown in FIG. 1, FIG. 1 is a schematic structural diagram of a terminal according to an embodiment of the present disclosure. A first processor 101 and a second processor 102 each are connected to a front-facing camera 103 by using a front-facing camera interface. The first processor 101, the second processor 102, and a screen 1061 are electrically connected to each other. In actual application, the second processor 102 in this embodiment of the present disclosure may be an application processor (which may be integrated by an image information processor or include an image information processing unit), and serve as a main processor, of the terminal, that is responsible for display on the screen 1061, playing of a video and audio, various applications, a voice call, data transmission, and the like. When a user presses a power key to start the terminal, the second processor 102 starts and runs, so that the terminal can be normally used. When the user turns off the power key, to reduce power consumption of the second processor 102, the second processor 102 enters a sleep mode, and in addition, in this embodiment of the present disclosure, only the first processor 101 with relatively low power consumption can work normally. Specifically, the first processor 101 is an auxiliary operation chip, and may be a coprocessor or an auxiliary processor, configured to: reduce load of an application processor in the terminal, and execute a preset processing task, for example, process image or video data, or sense and measure motion data, so as to reduce load of a main processor and then prolong a standby time. In this embodiment of the present disclosure, the coprocessor may receive and identify a low-power-consumption-mode image with relatively low power consumption at any time. It may be understood that, only an example description is provided herein. According to different specific terminal types, actually both the first processor 101 and the second processor 102 may be processors of an ARM architecture or an X86 architecture, or processors of another architecture. Further, the first processor 101 and the second processor 102 may be processing units, with different performance and functions, integrated into a same processor component. That is, this embodiment of the present disclosure imposes no specific limit on a combination of different types of processors.

It should be further noted that, the terminal in this embodiment of the present disclosure includes but is not limited to user equipment that includes the first processor 101, the second processor 102, the front-facing camera 103, and the screen 1061, such as a smartphone, a tablet computer, a media player, a smart TV, a smart band, a smart wearable device, an MP3 (Moving Picture Experts Group Audio Layer III, Moving Picture Experts Group Audio Layer III) player, an MP4 (Moving Picture Experts Group Audio Layer IV, Moving Picture Experts Group Audio Layer III) player, a personal digital assistant (Personal Digital Assistant, PDA), and a laptop portable computer.

Referring to FIG. 1, FIG. 1 is a schematic flowchart of a terminal control method according to an embodiment of the present disclosure. The following describes the terminal control method in this embodiment of the present disclosure in detail with reference to FIG. 1 from a perspective of interaction between a first processor and a second processor in a terminal.

Operation S201: When detecting that the front-facing camera is in a low power consumption mode, the second processor sends a first message to the first processor.

Specifically, the low power consumption mode in the present disclosure is a mode in which a normal photographing function of the front-facing camera is not enabled, that is, in this case, a user does not make the front-facing camera enter a normal photographing mode by using a related photographing application. A non-low power consumption mode is a mode in which the user enables the normal photographing function of the front-facing camera by using a related photographing application. It may be understood that, when the terminal switches from a power-off state to a power-on state, apparently, the front-facing camera is still in the low power consumption mode (because the normal photographing function of the camera may be enabled only after the terminal is powered on). Therefore, when the second processor detects that the terminal switches from the power-off state to the power-on state, and learns that the front-facing camera is in the low power consumption mode, or when the second processor detects that the front-facing camera exits from the non-low power consumption mode (the normal photographing mode is enabled) and enters the low power consumption mode (the normal photographing mode is not enabled), the second processor sends, to the first processor, the first message indicating that the front-facing camera is in the low power consumption mode. It may be further understood that, the first processor and the second processor may start at the same time when the terminal switches from the power-off state to the power-on state, or the first processor may start when the second processor sends the first message to the first processor.

Operation S202: After receiving the first message, the first processor controls the front-facing camera to collect a low-power-consumption-mode image in the low power consumption mode.

Specifically, in this embodiment of the present disclosure, after the terminal is powered on, both the first processor (for example, a coprocessor) and the second processor (for example, an application processor) are connected to the front-facing camera. In addition, an operation processing capability of the first processor is lower than that of the second processor, and power consumption of the first processor is usually lower than that of the second processor accordingly. Therefore, in a mode in which the normal photographing function of the front-facing camera of the terminal is not enabled, only the coprocessor receives the low-power-consumption-mode image output by the front-facing camera, so that the coprocessor determines, according to the received low-power-consumption-mode image, whether the image includes preset characteristic information such as human eye gaze characteristic information or facial characteristic information, to determine whether brightness of a screen of the terminal needs to be adjusted. In addition, the low-power-consumption-mode image (for example, an image with a low frame rate or low resolution) is used to minimize power consumption when the coprocessor keeps receiving the low-power-consumption-mode image output by the front-facing camera. The coprocessor receives the low-power-consumption-mode image, so as to determine, according to the low-power-consumption-mode image, whether the user currently gazes at the screen of the terminal or needs to use the terminal. Therefore, an image with higher definition or an image with a higher frame rate is not required, provided that it can be determined whether the preset characteristic information is included. This can avoid a waste of image resources and then avoid a waste of system power consumption.

Further, when the user needs to enable the photographing function of the front-facing camera, the application processor may receive a non-low-power-consumption-mode image (for example, an image with a high frame rate or high resolution) output by the front-facing camera in a mode in which the photographing function is enabled, so that the user can photograph a high-definition image. In this way, both intelligence of the terminal and a basic photographing function of the front-facing camera can be ensured.

Operation S203: The first processor receives the low-power-consumption-mode image and identifies whether there are a predetermined quantity of consecutive low-power-consumption-mode images that include preset characteristic information.

Specifically, the first processor identifies whether each frame of low-power-consumption-mode image includes the preset characteristic information. The preset characteristic information is characteristic information indicating that the user currently needs to use the terminal, and may be biological characteristic information such as human eye gaze information, infrared information, iris information, or facial recognition information. That is, the preset characteristic information may be used as a determining basis for determining whether the user is using or needs to use the terminal. Further, it can not only be determined whether the low-power-consumption-mode image includes the preset characteristic information, but also be determined whether current preset characteristic information belongs to the user of the terminal. For example, facial recognition of a preset user, human eye information recognition of a preset user, or the like may be performed. That is, when it is identified whether the user is currently using the terminal, it may also be checked whether the user is an authorized user, so that an unauthorized user is prevented from operating the mobile phone. This ensures both intelligence of the terminal and security of the terminal.

Further, in a process of identifying the preset characteristic information, an error may exist, and consequently, a determining result is inaccurate. Therefore, a predetermined quantity of low-power-consumption-mode images need to be consecutively identified. For example, when it is consecutively identified that five frames of low-power-consumption-mode images include human eye information, it may be considered that the user is currently using the terminal. In this way, the preset characteristic information is used as a determining basis for adjusting the brightness of the screen of the terminal.

Operation S204: The first processor adjusts brightness of a screen of the terminal according to an identification result.

Specifically, the first processor adjusts the brightness of the screen of the terminal according to the identification result. More specifically, the following may be included: The first processor controls the brightness of the screen of the terminal, or the first processor instructs the second processor to adjust the brightness of the screen of the terminal. A principle is that, when the coprocessor with relatively lower power consumption may be used to adjust and control the terminal, the coprocessor is preferentially used to adjust and control the terminal; and when the application processor with a strong operation processing capability or relatively high power consumption is required to implement control, it is necessary to use the second processor to control the terminal. The brightness of the screen may be adjusted by lighting up or turning off the screen of the terminal, adjusting the brightness, or the like. For example, when it is identified that the low-power-consumption-mode image has the preset characteristic information (for example, the human eye information), the sleeping application processor or another sleeping processor may be woken up, and the application processor that has been woken up is instructed to light up the off screen, so that when the user needs to use the terminal, a related processor in the terminal is in a waking state and the screen is in an on state. This facilitates use of the user.

It should be emphasized that, in the prior art, screen display of the terminal generally includes two functions: content display on the screen and backlight adjustment. Content that needs to be displayed on the screen is provided and transferred to the screen by the application processor, and is in the charge of an LCD driver. A backlight driver is responsible for lighting up and turning off backlight and adjusting brightness of the backlight. Although the two functions are implemented by using different software drivers, the application processor is essentially responsible for implementing both the functions. In addition, the two functions are usually associated from a perspective of a user. For example, content is loaded and displayed only when the backlight is on; and if the backlight is off, there is no need to display content, because if content is displayed on the screen but the backlight is off, or the backlight is on but no content is displayed, the user cannot use the terminal normally. Therefore, that the screen is in the on state mentioned in this embodiment of the present disclosure essentially means that to-be-displayed content is loaded onto the screen and the backlight is on; and that the screen is in an off state mentioned in the present disclosure essentially means that no to-be-displayed content is loaded onto the screen and the backlight is off.

However, in this embodiment of the present disclosure, the coprocessor is added, and the coprocessor may also control the backlight driver to light up and turn off the backlight and adjust the brightness of the backlight. Therefore, in this embodiment of the present disclosure, for the following reason, the application processor needs to implement the two functions (content display and backlight adjustment) only when the photographing function of the front-facing camera is enabled: When the photographing function is enabled, the backlight is definitely in an on state. Therefore, only the brightness of the backlight needs to be adjusted. In the present disclosure, a current ambient brightness value is calculated according to an image output by the front-facing camera, and then, the backlight is adjusted according to the brightness value. Therefore, in this case, only the application processor that is receiving a non-low-power-consumption-mode image can be used to adjust the backlight. In other scenarios in this embodiment of the present disclosure, it may be that only the application processor is responsible for loading content to be displayed on the screen, and the coprocessor directly lights up or turns off the backlight or adjusts the brightness of the backlight.

Further, in the foregoing embodiment, that "the first processor adjusts brightness of a screen of the terminal according to an identification result" in step S204 may be implemented in either of the following implementations:

Implementation 1: The first processor calculates a current ambient brightness value according to the low-power-consumption-mode image. When the first processor receives the low-power-consumption-mode image and identifies that there are a predetermined quantity of consecutive low-power-consumption-mode images that include the preset characteristic information, and the first processor detects that the second processor is in a waking state and the screen of the terminal is in an on state, the first processor adjusts the brightness of the screen of the terminal according to the ambient brightness value. A larger ambient brightness value indicates higher adjusted brightness of the screen of the terminal.

Specifically, the first processor may calculate the current ambient brightness value according to the low-power-consumption-mode image received in operation S203. For example, the ambient brightness value is estimated by calculating a brightness value of the low-power-consumption-mode image. Image brightness essentially depends on brightness of each pixel in the image, and the brightness of each pixel essentially depends on a size of an RGB value. When an RGB value is 0, a pixel is black, and when an RGB value is 255, a pixel is the brightest and the pixel is white. Therefore, an average brightness value of all the pixels in the low-power-consumption-mode image may be obtained by calculating an RGB value of each pixel in the low-power-consumption-mode image, and then, the current ambient brightness value is estimated with reference to a preset calculation formula according to the average brightness value of the low-power-consumption-mode image. Optionally, adjustment may be performed according to a preset brightness value, of the screen of the terminal, that is corresponding to a preset image brightness value. The present disclosure imposes no specific limit on a specific manner of calculating the current ambient brightness value. It may be understood that, this method step may be performed without requiring the terminal to include a light sensor. That is, instead of additionally using the light sensor to measure and calculate the current ambient brightness value, the current ambient brightness value is directly obtained by using a pixel brightness value of the low-power-consumption-mode image. This further reduces power consumption of the terminal. When the first processor receives the low-power-consumption-mode image and identifies that there are a predetermined quantity of consecutive low-power-consumption-mode images that include the preset characteristic information (that is, determines that the user currently needs to use the terminal), and the first processor detects that the second processor is in the waking state and the screen of the terminal is in the on state, the first processor directly adjusts the brightness of the screen of the terminal according to the calculated ambient brightness value. An adjustment principle is that a larger ambient brightness value indicates higher adjusted brightness of the screen of the terminal. It should be noted that, when the screen of the terminal is on, it necessarily indicates that loading of content that needs to be displayed on the screen is completed. Therefore, in this method step, the first processor may directly adjust the brightness of the screen of the terminal. Certainly, it may be understood that the first processor may instruct the second processor to adjust the brightness of the screen of the terminal. This is not specifically limited in the present disclosure.

Implementation 2: The first processor controls the second processor to adjust the brightness of the screen of the terminal according to the identification result. Specifically, the implementation 2 may be implemented in any one of the following specific implementations:

Specific implementation 1: When the first processor receives the low-power-consumption-mode image and identifies that there are a predetermined quantity of consecutive low-power-consumption-mode images that include the preset characteristic information, and the first processor detects that the second processor is in a sleep mode, the first processor wakes up the second processor and instructs the second processor to light up the screen of the terminal.

Specifically, when it is determined, according to the low-power-consumption-mode image received in step S203, that the user needs to use the terminal, and it is detected that the second processor is in the sleep mode, before adjusting the brightness of the screen of the terminal, the first processor needs to wake up the second processor and instruct the second processor to light up the screen of the terminal, because the screen of the terminal is definitely in an off state when the second processor is in the sleep mode. Further, the first processor notifies the second processor of a calculated ambient brightness value, so that the second processor can not only light up the screen, but also appropriately adjust the brightness of the screen of the terminal according to the ambient brightness value. This further improves user experience. It should be noted that, when the application processor is in the sleep mode, the screen of the terminal is definitely in the off state, because the processor may be sleeping on the premise that the screen of the terminal is definitely in the off state. On the contrary, when the application processor is in a waking state, the screen of the terminal is not necessarily in the on state, for example, in a case in which a background application runs and no operation is performed in the foreground in a specific time.

Specific implementation 2: When the first processor receives the low-power-consumption-mode image and identifies that there are a predetermined quantity of consecutive low-power-consumption-mode images that include the preset characteristic information, and the first processor detects that the second processor is in a waking state and the screen of the terminal is in an off state, the first processor instructs the second processor to light up the screen of the terminal.

Specifically, when it is determined, according to the low-power-consumption-mode image received in operation S203, that the user needs to use the terminal, and it is detected that the second processor is in the waking state and the screen of the terminal is in the off state, the second processor is instructed to light up the screen of the terminal, and the second processor is notified of a calculated ambient brightness value. For example, when the user is listening to music or is being on a call, to reduce power consumption, the screen enters the off state after a specific time. However, a related music application or a related call application runs in the background in this case, and therefore, the second processor (the application processor) is actually still in the waking state. In this case, the first processor only needs to instruct the second processor to light up the screen of the terminal. Further, the second processor may adjust the brightness of the screen of the terminal with reference to the calculated ambient brightness value.

Specific implementation 3: When the first processor receives the low-power-consumption-mode image and identifies that no predetermined quantity of consecutive low-power-consumption-mode images include the preset characteristic information, and the first processor detects that the screen of the terminal is in an on state, the first processor instructs the second processor to turn off the screen of the terminal.

Specifically, when it is determined, according to the low-power-consumption-mode image received in step S203, that the user does not need to use the terminal temporarily, the first processor instructs the second processor to turn off the screen of the terminal, so that power consumption is further reduced. It should be understood that, a reason that there is no need to instruct the second processor to sleep is that switching of the second processor (for example, the application processor) from a sleep mode to a waking state may be triggered or instructed by using an external element (a physical key, a preset gesture, or the first processor). However, switching of the application processor from the waking state to the sleep mode can be controlled only by the application processor, because only the application processor can learn whether a background application still runs currently, so as to determine whether the application processor needs to be in the waking state. Therefore, only the application processor can determine whether the application processor can switch from the waking state to the sleep mode Therefore, in this method step, when it is detected that no user needs to use the terminal, the first processor can control only turning off of the screen of the terminal, but cannot control the second processor to sleep (as described above, only the second processor can perform such control). Therefore, herein, the first processor only needs to instruct the second processor to adjust the brightness of the screen of the terminal.

It should be noted that, in all of the specific implementation 1, the specific implementation 2, and the specific implementation 3 in this embodiment of the present disclosure, the first processor (the coprocessor) instructs the second processor (the application processor) to adjust the brightness of the screen, because this can ensure synchronization between content display on the screen and lighting up of the backlight (including brightness adjustment) (in this case, if content display on the screen and lighting up of the backlight are triggered by using different processors, possibly, synchronization cannot be ensured, and therefore, user experience is poor). However, in the implementation 1, the coprocessor adjusts the brightness of the screen for the following reason: The application processor in the terminal is in the waking state and the screen is in the on state in this case, and therefore, only backlight brightness needs to be adjusted. Therefore, the coprocessor that receives the image and calculates the current ambient brightness value may be directly used to perform adjustment (because a problem of synchronization between content display and lighting up of the backlight does not exist). Although this embodiment of the present disclosure provides a preferred implementation, the present disclosure still includes and covers all implementations, in a scenario other than a scenario in which the photographing function of the front-facing camera is enabled, in which only the application processor is responsible for loading content to be displayed on the screen and the coprocessor directly lights up or turns off the backlight or adjusts the brightness of the backlight. All actual specific cases are not listed one by one herein.

In this embodiment of the present disclosure, in the terminal including the first processor, the second processor, and the front-facing camera, the first processor with relatively low power consumption can control the front-facing camera to collect the low-power-consumption-mode image in the low power consumption mode, then, receive the low-power-consumption-mode image and identify whether there are a predetermined quantity of consecutive low-power-consumption-mode images that include the preset characteristic information, and finally, adjust the brightness of the screen of the terminal according to the identification result. Therefore, the processor may intelligently and automatically adjust the brightness of the screen of the terminal, without requiring the user to perform a manual operation. In addition, in this implementation, the first processor with relatively low power consumption controls the front-facing camera to collect the low-power-consumption-mode image, performs identification, and finally, adjusts the brightness of the screen of the terminal, so that the second processor with relatively high power consumption is prevented from excessively participating in brightness adjustment to the screen of the terminal, power consumption of the terminal is reduced, and a battery life is prolonged. That is, both intelligence and the battery life of the terminal can be ensured, great convenience is provided for the user during use of the terminal, and user experience is improved.

Figure 3:
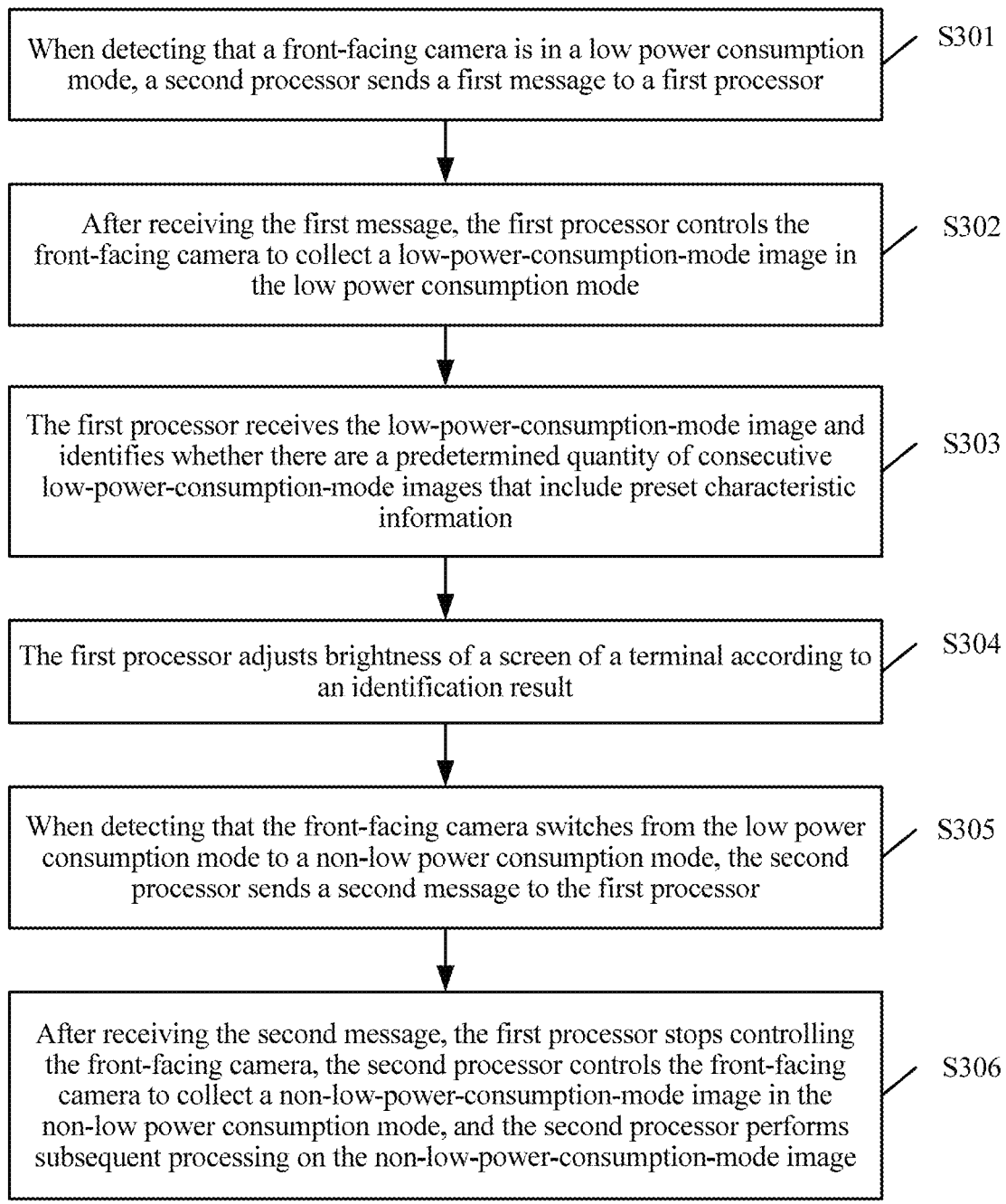
FIG. 3 is a schematic flowchart of another terminal control method according to an embodiment of the present disclosure.

Referring to FIG. 3, FIG. 3 is a schematic flowchart of another terminal control method according to an embodiment of the present disclosure. The following describes the terminal control method in this embodiment of the present disclosure in detail with reference to FIG. 3 from a perspective of interaction between a first processor and a second processor in a terminal.

Operation S301: When detecting that the front-facing camera is in a low power consumption mode, the second processor sends a first message to the first processor, where the first message indicates that the front-facing camera is in the low power consumption mode.

Operation S302: After receiving the first message, the first processor controls the front-facing camera to collect a low-power-consumption-mode image in the low power consumption mode.

Operation S303: The first processor receives the low-power-consumption-mode image and identifies whether there are a predetermined quantity of consecutive low-power-consumption-mode images that include preset characteristic information, where the preset characteristic information is characteristic information indicating that a user currently needs to use the terminal.

Operation S304: The first processor adjusts brightness of a screen of the terminal according to an identification result.

Figure 2:
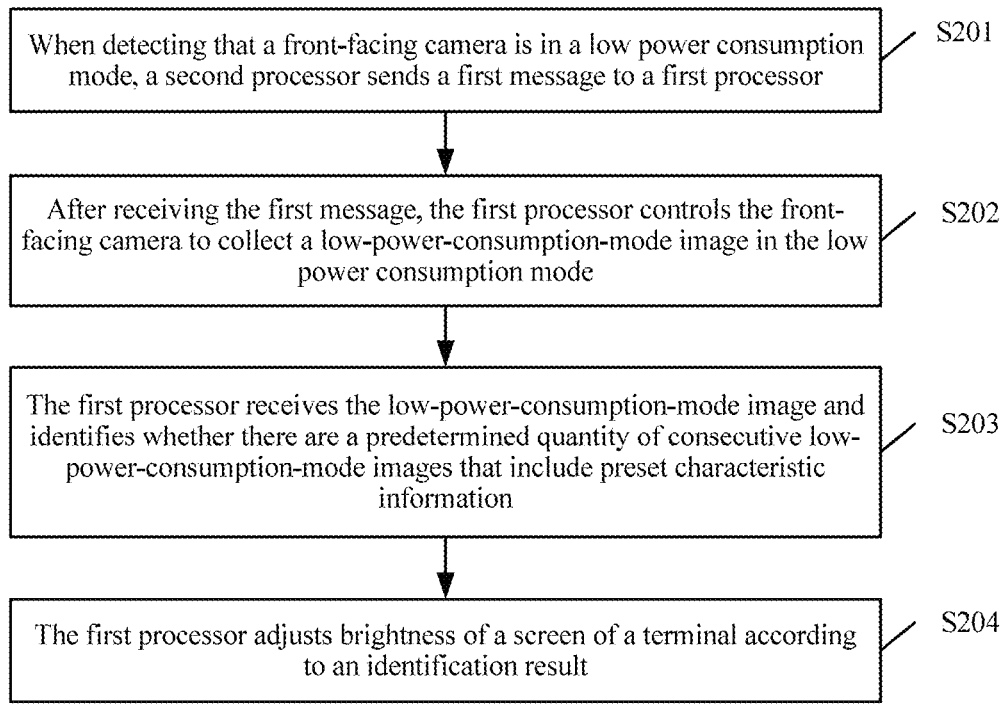
FIG. 2 is a schematic flowchart of a terminal control method according to an embodiment of the present disclosure.

Specifically, for operation S301 to operation S304, correspondingly refer to operation S201 to operation S204 in the embodiment provided in FIG. 2. Specific implementations are not described herein again.

Operation S304: When detecting that the front-facing camera switches from the low power consumption mode to a non-low power consumption mode, the second processor sends a second message to the first processor, where the second message indicates that the front-facing camera switches to the non-low power consumption mode.

Specifically, in this embodiment of the present disclosure, to reduce power consumption of the terminal, the first processor controls the camera to collect a low-power-consumption-mode image with a relatively low frame rate or relatively low resolution. Although the mode image can meet a requirement that the first processor uses the mode image to identify the preset characteristic information, the mode image cannot meet high-resolution and high-definition requirements of the user for a photographed photo. Therefore, after the second processor receives a photographing enabling instruction for the front-facing camera, the second processor needs to control the front-facing camera to output a non-low-power-consumption-mode image with a higher frame rate and/or higher resolution, so as to meet the photographing requirement of the user. When detecting that the front-facing camera switches from the low power consumption mode to the non-low power consumption mode, for example, when receiving an instruction for disabling a photographing function of the front-facing camera, the second processor notifies the first processor that the front-facing camera switches to the non-low power consumption mode.

Operation S305: After receiving the second message, the first processor stops controlling the front-facing camera, the second processor controls the front-facing camera to collect a non-low-power-consumption-mode image in the non-low power consumption mode, and the second processor performs subsequent processing on the non-low-power-consumption-mode image.

Specifically, after receiving the second message, the first processor stops controlling the front-facing camera, that is, stops controlling the front-facing camera to collect the low-power-consumption-mode image; instead, the second processor controls the front-facing camera to collect the non-low-power-consumption-mode image in the non-low power consumption mode; and the second processor performs subsequent image processing and the like on the non-low-power-consumption-mode image, so as to meet the normal photographing requirement of the user.

In this embodiment of the present disclosure, the method and a corresponding beneficial effect in the embodiment of FIG. 2 are retained. A main difference lies in that, in this embodiment of the present disclosure, after detecting that a normal photographing function of the front-facing camera is enabled, the second processor (for example, an application processor) controls the front-facing camera to collect and output the non-low-power-consumption-mode image with a frame rate or resolution higher than that of the low-power-consumption-mode image, so that the user can achieve a normal photographing effect when the user needs to use the photographing function of the front-facing camera. This not only implements a function of identifying the preset characteristic information by using the front-facing camera, but also retains and ensures a basic function of the front-facing camera serving as a camera sensor. In this way, both intelligence and low power consumption of the terminal are further ensured, and user experience is further improved.

Figure 4A:
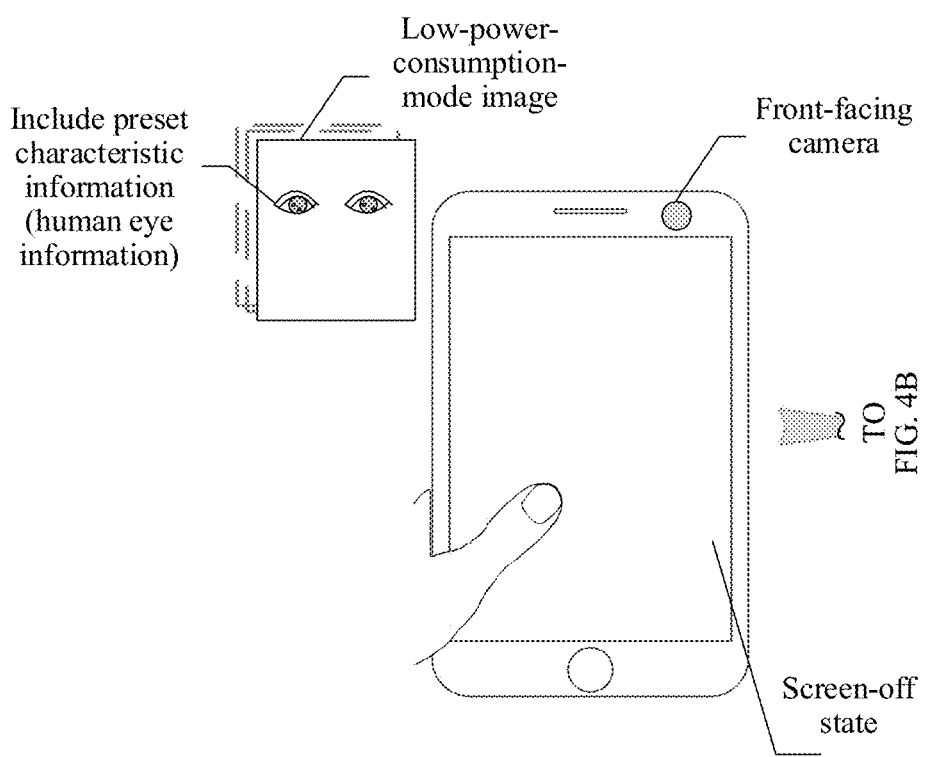
FIG. 4A and FIG. 4B are a schematic diagram of a specific application scenario of a terminal control method according to an embodiment of the present disclosure.
Figure 4B:
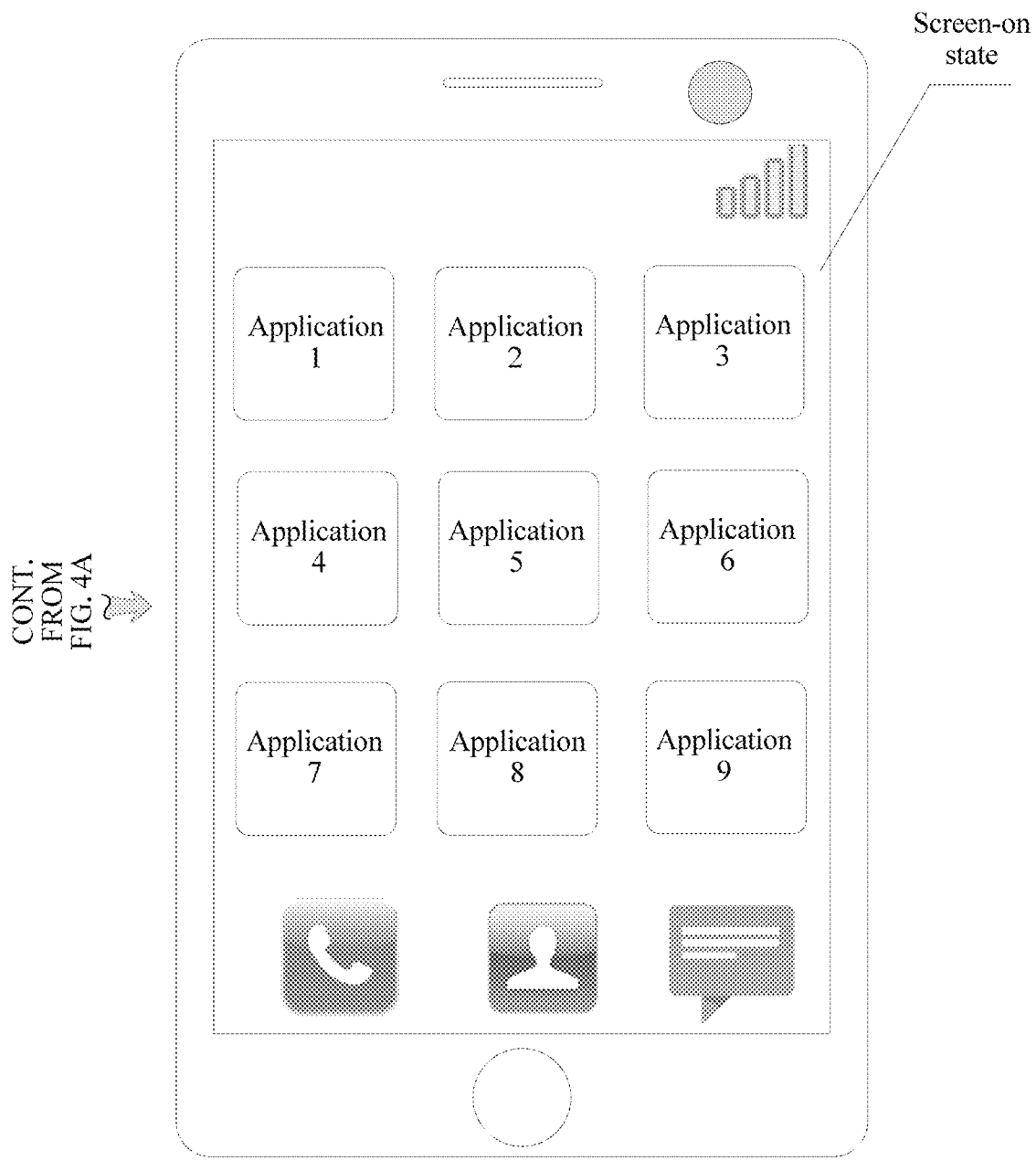

In a specific application scenario, as shown in FIG. 4A and FIG. 4B, FIG. 4A and FIG. 4B are a schematic diagram of a specific application scenario of a terminal control method according to an embodiment of the present disclosure. In FIG. 4A and FIG. 4B, when a terminal is in a screen-off state or a sleep mode, a first processor identifies that there are a predetermined quantity (such as five frames) of consecutive low-power-consumption-mode images that include human eye information, and may determine that a user needs to use the terminal in this case. Therefore, the terminal may be adjusted according to an actual working status of the terminal. For example, when an application processor is in a sleep mode, the application processor is instructed to wake up and light up a screen; or when an application processor is in a waking state but a screen is in an off state, the application processor is instructed only to light up the screen of the terminal.

Figure 5A:
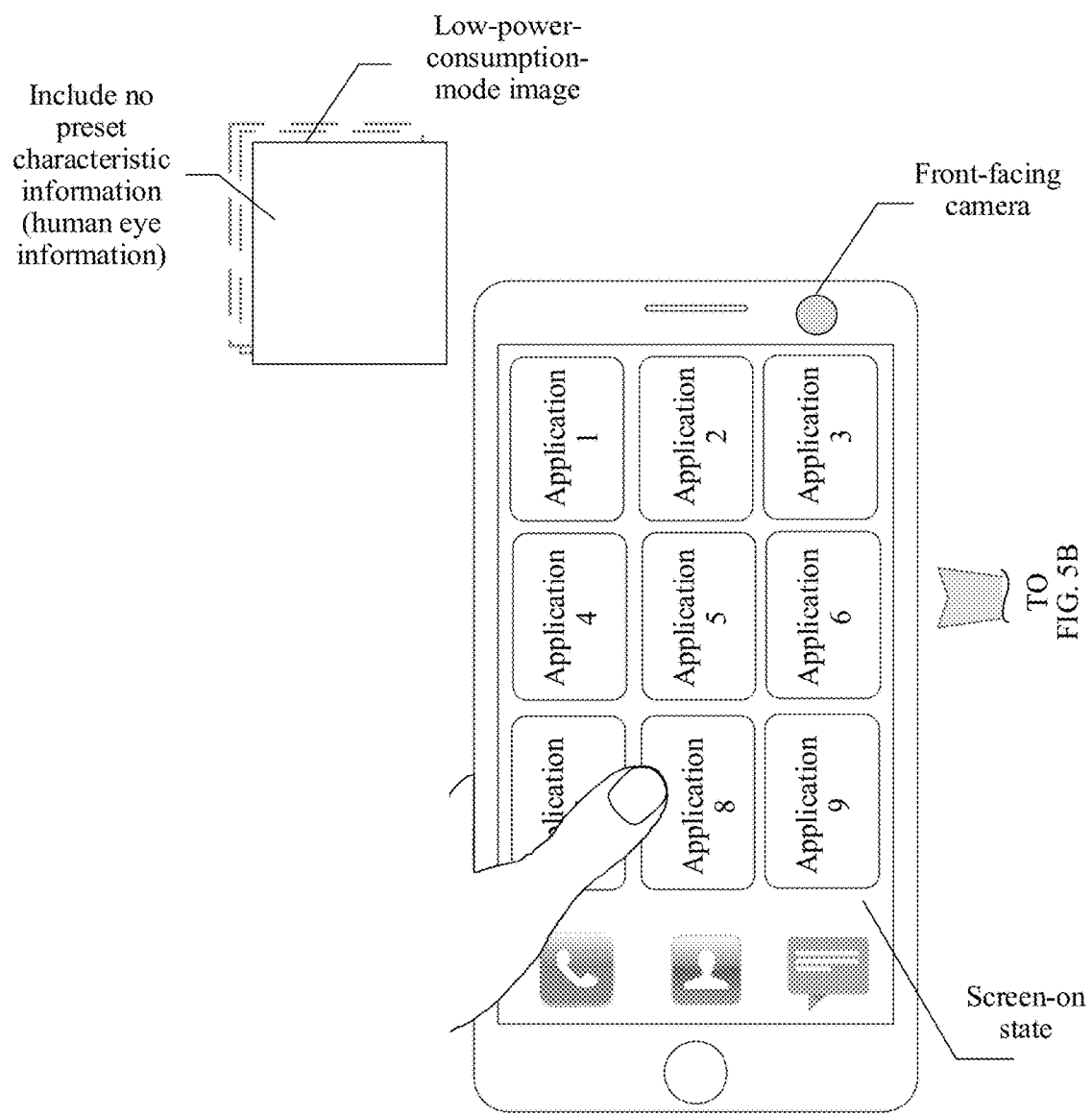
FIG. 5A and FIG. 5B are a schematic diagram of another specific application scenario of a terminal control method according to an embodiment of the present disclosure.
Figure 5B:
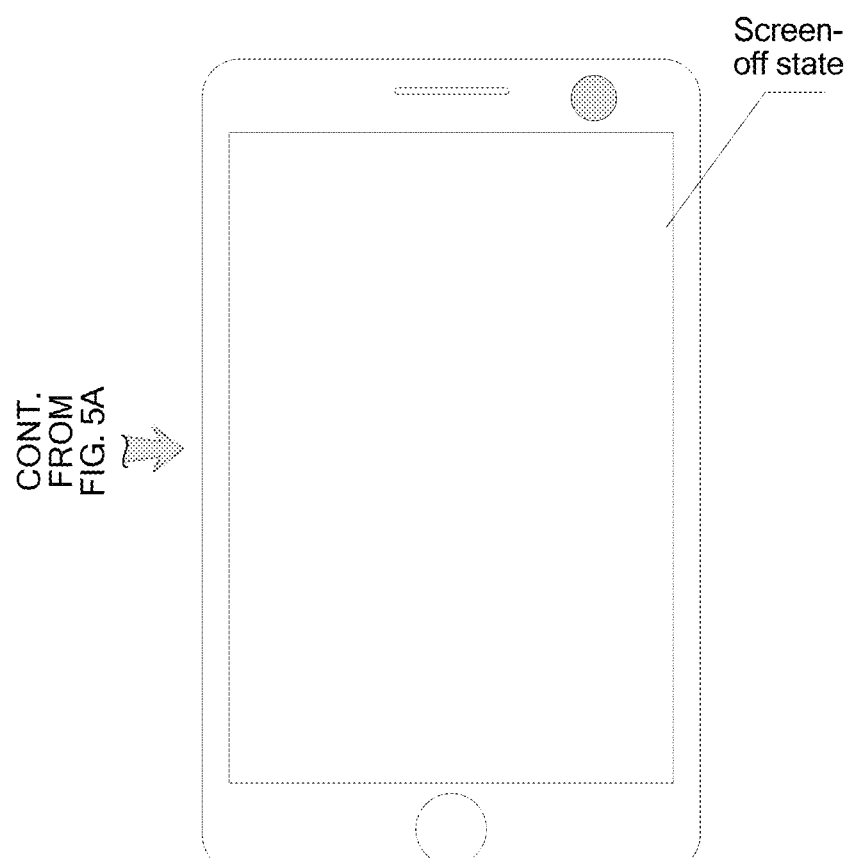

In a specific application scenario, as shown in FIG. 5A and FIG. 5B, FIG. 5A and FIG. 5B are a schematic diagram of another specific application scenario of a terminal control method according to an embodiment of the present disclosure. In FIG. 5A and FIG. 5B, when a terminal is in a screen-on state, a first processor identifies that no predetermined quantity (for example, five frames) of consecutive low-power-consumption-mode images include human eye information, and may determine that a screen of the terminal is out of sight of a user or a user does not need to use the terminal temporarily in this case. Therefore, brightness of the screen of the terminal may be adjusted, that is, an application processor is instructed to turn off the screen of the terminal, so that power consumption of the terminal is reduced.

Figure 6A:
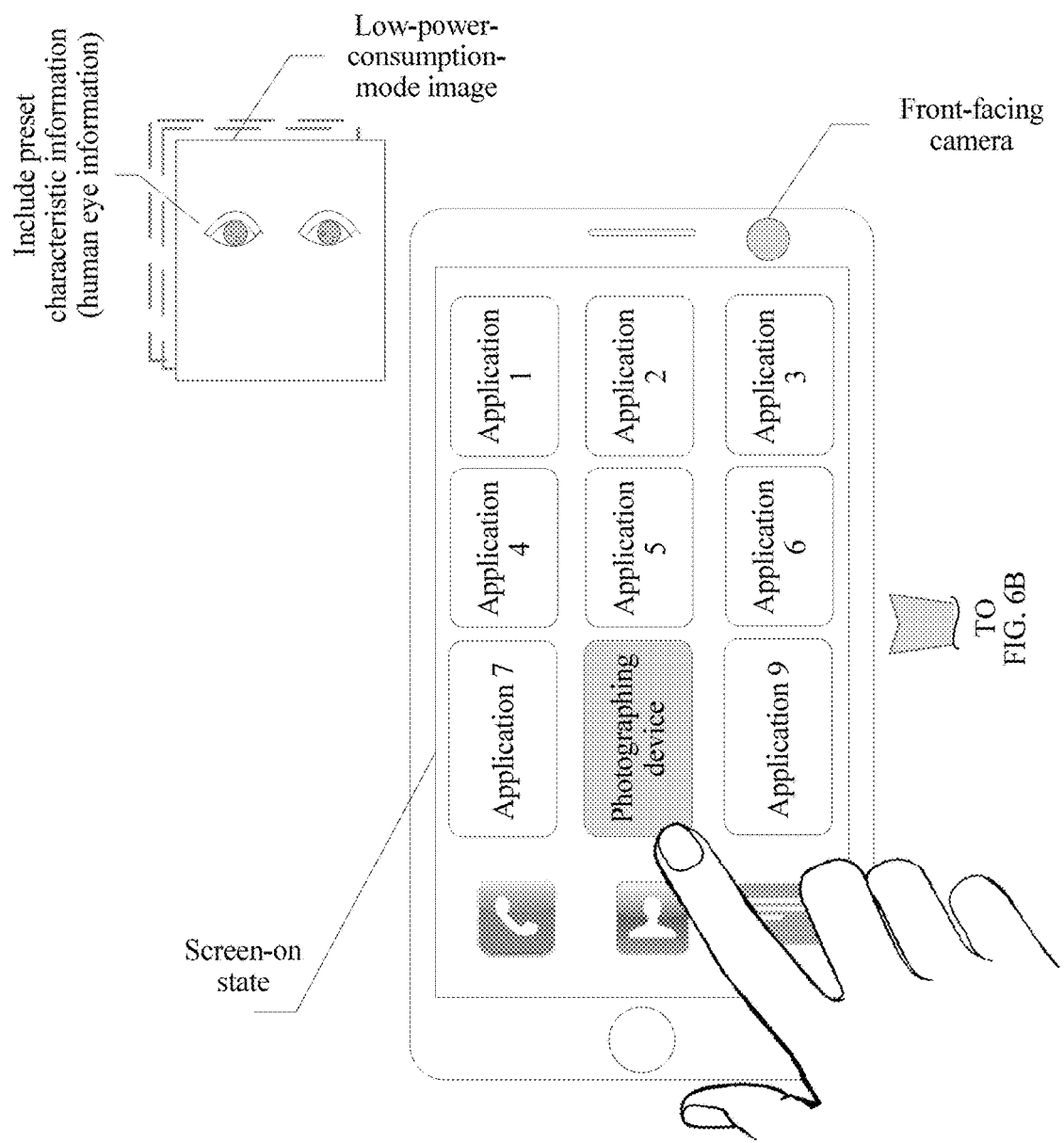
FIG. 6A and FIG. 6B are a schematic diagram of still another specific application scenario of a terminal control method according to an embodiment of the present disclosure.
Figure 6B:
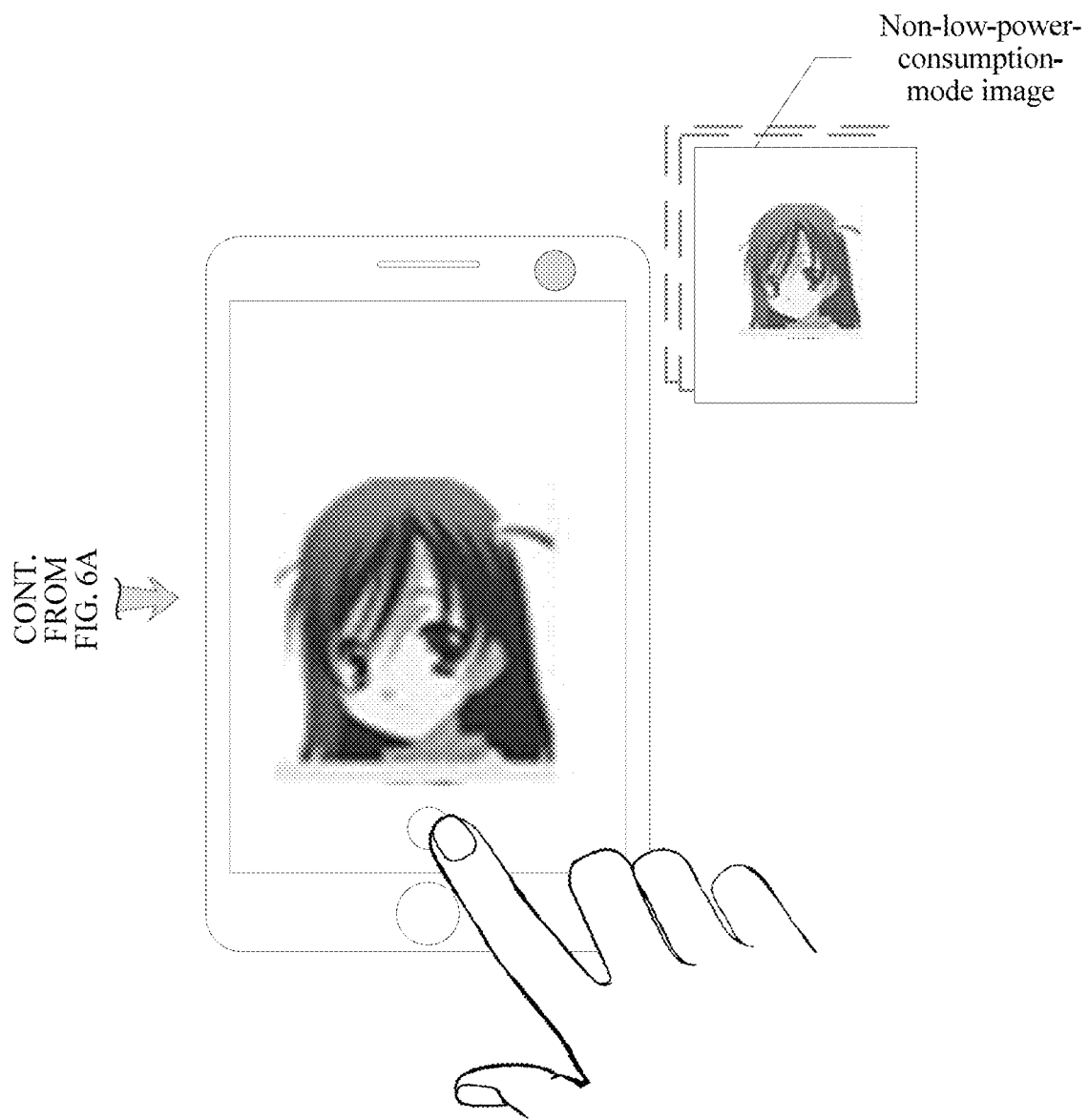

In a specific application scenario, as shown in FIG. 6A and FIG. 6B, FIG. 6A and FIG. 6B are a schematic diagram of still another specific application scenario of a terminal control method according to an embodiment of the present disclosure. In FIG. 6A and FIG. 6B, when a photographing function of a front-facing camera is not enabled, the front-facing camera transmits a collected low-power-consumption-mode image with a relatively low frame rate or relatively low resolution to a first processor, so that the first processor identifies whether the image includes preset characteristic information. When a user taps a photographing device application and then enables the normal photographing function (for example, a selfie mode) of the front-facing camera, the front-facing camera immediately switches to collecting a non-low-power-consumption-mode image with a relatively high frame rate or relatively high resolution, so that the user can obtain a high-quality photo or video by means of photographing. For more specific implementation details and more actual application scenarios not listed one by one herein, refer to the method embodiments of FIG. 2 and FIG. 3.

To better implement the foregoing method embodiments in the embodiments of the present disclosure, the present disclosure further provides a related terminal for implementing the foregoing method embodiments. The following provides detailed descriptions with reference to a schematic structural diagram of a terminal shown in FIG. 7.

Figure 7:
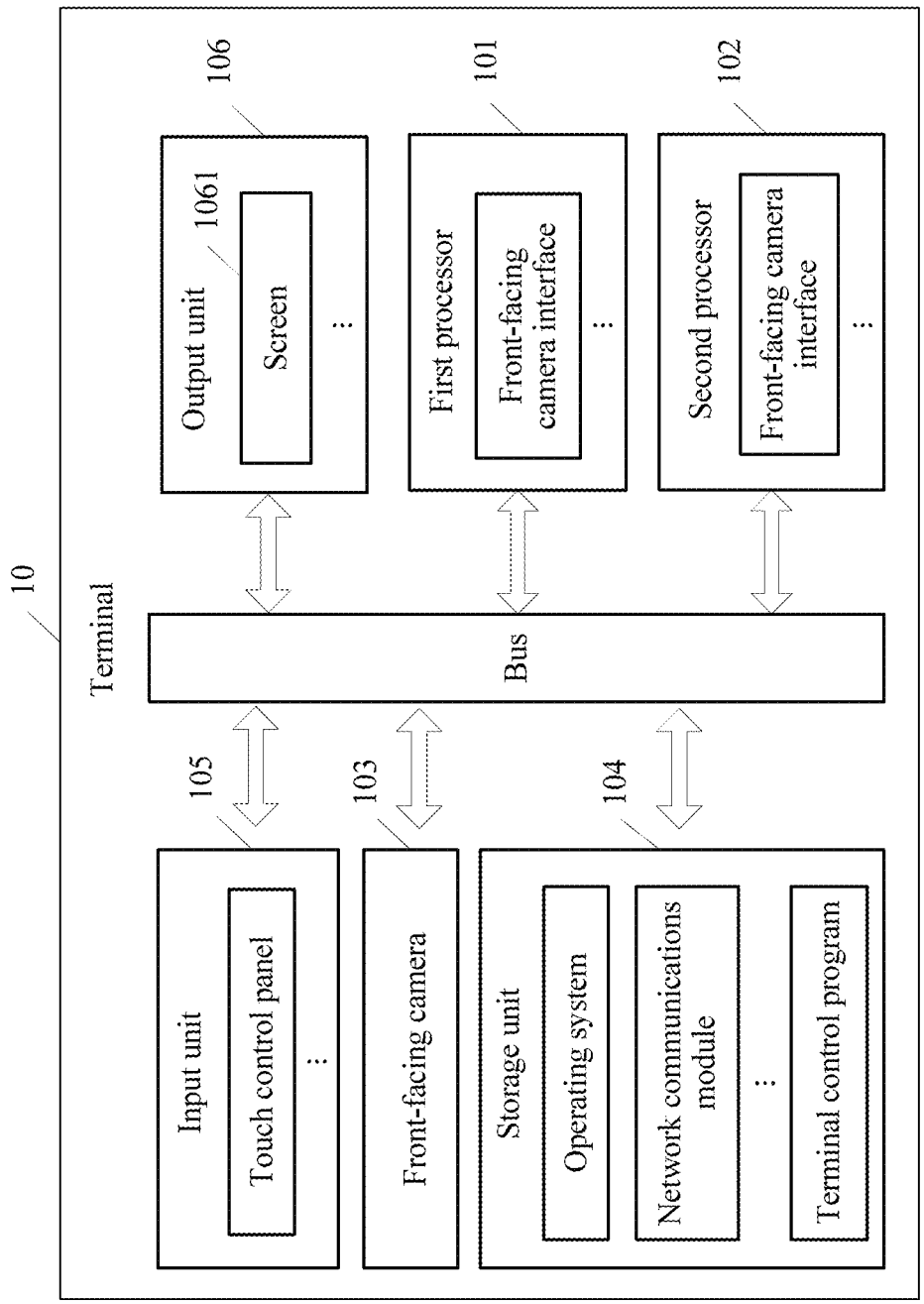
FIG. 7 is a schematic structural diagram of another embodiment of a terminal according to the present disclosure.

As shown in FIG. 7, the terminal 10 may include at least one first processor 101 such as a coprocessor, at least one second processor 102 such as an application processor, at least one bus, a front-facing camera 103, a storage unit 104, at least one input unit 105, and at least one output unit 106. The bus is configured to implement communication connections between these components. The input unit 105 may be specifically a touch control panel of the terminal, including a touchscreen and a touch control screen and configured to detect an operation instruction (for example, an instruction for enabling a photographing function or an instruction for disabling a photographing function) on the touch control panel of the terminal. The output unit 106 may include a screen (Display) 1061 of the terminal, configured to output and display an image, data, or the like. The storage unit 104 may be a high-speed RAM display, or may be a non-volatile memory, for example, at least one magnetic display. Optionally, the storage unit 104 may be at least one display apparatus far away from the first processor 101 and the second processor 102. As a computer display medium, the storage unit 104 may include an operating system, a network communications unit, a user interface module, a terminal control program, and the like.

In the terminal 10 shown in FIG. 7, an operation processing capability of the first processor 101 is lower than an operation processing capability of the second processor 102. The storage unit 104 is configured to store program code. The second processor 102 is configured to invoke the program code stored by the storage unit 104, to perform the following step: when it is detected that the front-facing camera is in a low power consumption mode, sending a first message to the first processor 101. The first message indicates that the front-facing camera is in the low power consumption mode.

The first processor 101 is configured to invoke the program code stored by the storage unit 104, to perform the following steps: after the first message is received, controlling the front-facing camera to collect a low-power-consumption-mode image in the low power consumption mode; receiving the low-power-consumption-mode image and identifying whether there are a predetermined quantity of consecutive low-power-consumption-mode images that include preset characteristic information, where the preset characteristic information is characteristic information indicating that a user currently needs to use the terminal; and adjusting brightness of a screen of the terminal according to an identification result.

In an optional solution, the first processor 101 is configured to:

calculate a current ambient brightness value according to the low-power-consumption-mode image; and when receiving the low-power-consumption-mode image and identifying that there are a predetermined quantity of consecutive low-power-consumption-mode images that include the preset characteristic information, and detecting that the second processor 102 is in a waking state and the screen of the terminal is in an on state, adjust the brightness of the screen of the terminal according to the ambient brightness value, where a larger ambient brightness value indicates higher adjusted brightness of the screen of the terminal.

In another optional solution, the first processor 101 is configured to:

control, by the first processor 101, the second processor 102 to adjust the brightness of the screen of the terminal according to the identification result.

In still another optional solution, the first processor 101 is specifically configured to:

when receiving the low-power-consumption-mode image and identifying that there are a predetermined quantity of consecutive low-power-consumption-mode images that include the preset characteristic information, and detecting that the second processor 102 is in a sleep mode, wake up, by the first processor 101, the second processor 102 and instruct the second processor 102 to light up the screen of the terminal.

In still another optional solution, the first processor 101 is configured to:

when receiving the low-power-consumption-mode image and identifying that there are a predetermined quantity of consecutive low-power-consumption-mode images that include the preset characteristic information, and detecting that the second processor 102 is in a waking state and the screen of the terminal is in an off state, instruct, by the first processor 101, the second processor 102 to light up the screen of the terminal.

In still another optional solution, the first processor 101 is configured to:

when receiving the low-power-consumption-mode image and identifying that no predetermined quantity of consecutive low-power-consumption-mode images include the preset characteristic information, and detecting that the screen of the terminal is in an on state, instruct the second processor 102 to turn off the screen of the terminal.

In still another optional solution, the first processor 101 is further configured to calculate a current ambient brightness value according to the low-power-consumption-mode image.

The first processor 101 is specifically configured to send the ambient brightness value to the second processor 102.

The second processor 102 is specifically configured to adjust the brightness of the screen of the terminal according to the ambient brightness value. A larger ambient brightness value indicates higher adjusted brightness of the screen of the terminal.

In still another optional solution, the second processor 102 is further configured to: when detecting that the front-facing camera switches from the low power consumption mode to a non-low power consumption mode, send a second message to the first processor 101. The second message indicates that the front-facing camera switches to the non-low power consumption mode.

The first processor 101 is further configured to: after receiving the second message, stop controlling the front-facing camera.

The second processor 102 is further configured to: control the front-facing camera to collect a non-low-power-consumption-mode image in the non-low power consumption mode, and perform subsequent processing on the non-low-power-consumption-mode image.

In still another optional solution, the first processor 101 is a coprocessor, and the second processor 102 is an application processor.

It may be understood that, for functions of the modules in the terminal 10, refer to specific implementations in the method embodiments of FIG. 2 and FIG. 3. Details are not described herein again.

An embodiment of the present disclosure further provides a computer storage medium. The computer storage medium may store a program. When the program runs, some or all of steps in either of the terminal control methods recorded in the foregoing method embodiments are performed.

In the foregoing embodiments, the description of each embodiment has respective focuses. For a part that is not described in detail in an embodiment, refer to related descriptions in other embodiments.

It should be noted that, to make the description brief, the foregoing method embodiments are expressed as a series of actions. However, persons skilled in the art should appreciate that the present disclosure is not limited to the described action sequence, because according to the present disclosure, some steps may be performed in other sequences or performed simultaneously. In addition, persons skilled in the art should also appreciate that all the embodiments described in this specification are preferred embodiments, and the related actions and modules are not necessarily mandatory to the present disclosure.

In the several embodiments provided in this application, it should be understood that the disclosed apparatus may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be indirect couplings or communication connections between some interfaces, apparatuses, or units, and may be implemented in electrical, mechanical, or other forms.

The units described as separate parts may or may not be physically separate, and parts displayed as units may or may not be physical units, may be located in one position, or may be distributed on a plurality of network units. Some or all of the units may be selected according to actual requirements to achieve the objectives of the solutions of the embodiments.

In addition, functional units in the embodiments of the present disclosure may be integrated into one processing unit, or each of the units may exist alone physically, or two or more units may be integrated into one unit. The integrated unit may be implemented in a form of hardware, or may be implemented in a form of a software functional unit.

When the foregoing integrated unit is implemented in the form of a software functional unit and sold or used as an independent product, the integrated unit may be stored in a computer-readable storage medium. Based on such an understanding, the technical solutions of the present disclosure essentially, or the part contributing to the prior art, or all or some of the technical solutions may be implemented in the form of a software product. The software product is stored in a storage medium and includes several instructions for instructing a computer device (which may be a personal computer, a server, a network device, or the like, and may be specifically a processor in a computer device) to perform all or some of the steps of the foregoing methods described in the embodiments of the present disclosure. The foregoing storage medium includes: any medium that can store program code, such as a USB flash drive, a removable hard disk, a magnetic disk, an optical disc, a read-only memory (English: read-only memory, ROM for short), or a random access memory (English: random access memory, RAM for short).

The foregoing embodiments are merely intended to describe the technical solutions of the present disclosure, but not to limit the present disclosure. Although the present disclosure is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of the present disclosure.

What is claimed is:

1. A terminal control method, applied to a terminal comprising a coprocessor, an application processor, and a front-facing camera having a low-power consumption mode and a non-low power consumption mode, wherein an operation processing capability of the coprocessor is lower than an operation processing capability of the application processor, and the coprocessor and application processor each have an interface to the front facing camera, and the method comprises:

when detecting that the front-facing camera is in the low power consumption mode, sending, by the application processor, a first message to the coprocessor, wherein the first message indicates that the front-facing camera is in the low power consumption mode;

after receiving the first message, controlling, by the coprocessor, the front-facing camera to collect a low-power-consumption-mode image in the low power consumption mode;

receiving, by the coprocessor, the low-power-consumption-mode image and identifying whether a predetermined number of consecutive low-power-consumption-mode images have been received that comprise predetermined characteristic information, indicating that a user currently needs to use the terminal; and adjusting, by the coprocessor, brightness of a screen of the terminal according to an identification result, wherein the adjusting comprises:

turning off the screen of the terminal if the coprocessor receives the low-power-consumption-mode image and identifies that there is no predetermined number of consecutive low-power-consumption-mode images that comprise the predetermined characteristic information and the coprocessor detects that the screen of the terminal is in an on state, wherein the predetermined characteristic information includes eye gaze information and facial information, by the coprocessor instructing the application processor to turn off the screen of the terminal by reducing brightness of backlight; and waking up, by the coprocessor, the application processor from a sleep mode and instructing the application processor to light up and turn on the screen of the terminal, when the coprocessor receives the low-power-consumption-mode image and identifies that there are a predetermined number of consecutive low-power-consumption-mode images that comprise the predetermined characteristic information, wherein the predetermined characteristic information includes eye gaze information and facial information.

2. The method according to claim 1, wherein the adjusting, by the coprocessor, brightness of a screen of the terminal according to an identification result comprises:

calculating, by the coprocessor, a current ambient brightness value according to the low-power-consumption-mode image; and when the coprocessor receives the low-power-consumption-mode image and identifies that there are a predetermined number of consecutive low-power-consumption-mode images that comprise the characteristic information, and the coprocessor detects that the application processor is in a waking state and the screen of the terminal is in an on state, adjusting, by the coprocessor, the brightness of the screen of the terminal according to the current ambient brightness value, wherein a larger ambient brightness value indicates higher adjusted brightness of the screen of the terminal.

3. The method according to claim 1, further comprising:

calculating, by the coprocessor, a current ambient brightness value according to the low-power-consumption-mode image; and wherein the instructing, by the coprocessor, the application processor to light up the screen of the terminal comprises:

sending, by the coprocessor, the current ambient brightness value to the application processor, and adjusting, by the application processor, the brightness of the screen of the terminal according to the current ambient brightness value, wherein a larger ambient brightness value indicates higher adjusted brightness of the screen of the terminal.

4. The method according to claim 1, further comprising:

when detecting that the front-facing camera switches from the low power consumption mode to the non-low power consumption mode, sending, by the application processor, a second message to the coprocessor, wherein the second message indicates that the front-facing camera switches to the non-low power consumption mode; and after receiving the second message,
stopping, by the coprocessor, controlling the front-facing camera,
controlling, by the application processor, the front-facing camera to collect a non-low-power-consumption-mode image in the non-low power consumption mode, and
performing, by the application processor, subsequent processing on the non-low-power-consumption-mode image.

5. A terminal, comprising:
a coprocessor,
an application processor, a front-facing camera having a low-power consumption mode and a non-low power consumption mode, wherein the coprocessor and the application processor each have an interface to the front facing camera, and a storage unit having program code stored thereon, wherein an operation processing capability of the coprocessor is lower than an operation processing capability of the application processor, the storage unit is configured to store program code, and the application processor is configured to invoke the program code stored in the storage unit, when it is detected that the front-facing camera is in the low power consumption mode, sending a first message to the coprocessor, indicating that the front-facing camera is in the low power consumption mode; and wherein the coprocessor is configured to invoke the program code stored by the storage unit to after the first message is received, control the front-facing camera to collect a low-power-consumption-mode image in the low power consumption mode;

receive the low-power-consumption-mode image and identify whether there a predetermined number of consecutive low-power-consumption-mode images have been received that comprise predetermined characteristic information, indicating that a user currently needs to use the terminal; and adjust brightness of a screen of the terminal according to an identification result, wherein the adjusting comprises:

turning off the screen of the terminal if the coprocessor receives the low-power-consumption-mode image and identifies that there is no predetermined number of consecutive low-power-consumption-mode images that comprise the predetermined characteristic information and the coprocessor detects that the screen of the terminal is in an on state, wherein the predetermined characteristic information includes eye gaze information and facial information, by the coprocessor instructing the application processor to turn off the screen of the terminal by reducing brightness of backlight; and waking up, by the coprocessor, the application processor from a sleep mode and instructing the application processor to light up and turn on the screen of the terminal, when the coprocessor receives the low-power-consumption-mode image and identifies that there are a predetermined number of consecutive low-power-consumption-mode images that comprise the predetermined characteristic information, wherein the predetermined characteristic information includes eye gaze information and facial information.

6. The terminal according to claim 5, wherein the coprocessor is configured to:

calculate a current ambient brightness value according to the low-power-consumption-mode image; and when receiving the low-power-consumption-mode image and identifying that there are a predetermined number of consecutive low-power-consumption-mode images that comprise the characteristic information, and detecting that the application processor is in a waking state and the screen of the terminal is in an on state, adjust the brightness of the screen of the terminal according to the current ambient brightness value, wherein a larger ambient brightness value indicates higher adjusted brightness of the screen of the terminal.

7. The terminal according to claim 5, wherein the coprocessor is further configured to calculate a current ambient brightness value according to the low-power-consumption-mode image;

wherein the coprocessor is configured to send the current ambient brightness value to the application processor; and wherein the application processor is configured to adjust the brightness of the screen of the terminal according to the current ambient brightness value, wherein a larger ambient brightness value indicates higher adjusted brightness of the screen of the terminal.

8. The terminal according to claim 5, wherein the application processor is further configured to: when detecting that the front-facing camera switches from the low power consumption mode to the non-low power consumption mode, send a second message to the coprocessor, wherein the second message indicates that the front-facing camera switches to the non-low power consumption mode;

wherein the coprocessor is further configured to: after receiving the second message, stop controlling the front-facing camera; and wherein the application processor is further configured to: control the front-facing camera to collect a non-low-power-consumption-mode image in the non-low power consumption mode, and perform subsequent processing on the non-low-power-consumption-mode image.

9. A non-transitory computer-readable medium having instructions stored therein, which when executed by a terminal having a coprocessor, an application processor, and a front-facing camera having a low-power-consumption mode and a non-low-power-consumption mode, wherein an operation processing capability of the coprocessor is lower than an operation processing capability of the application processor, and the coprocessor and application processor each have an interface to the front-facing camera, cause the terminal to perform a method, the method comprising:

when detecting that the front-facing camera is in the low power consumption mode, sending, by the application processor, a first message to the coprocessor, wherein the first message indicates that the front-facing camera is in the low power consumption mode;

after receiving the first message, controlling, by the coprocessor, the front-facing camera to collect a low-power-consumption-mode image in the low power consumption mode;

receiving, by the coprocessor, the low-power-consumption-mode image and identifying whether a predetermined number of consecutive low-power-consumption-mode images have been received that comprise predetermined characteristic information, indicating that a user currently needs to use the terminal; and adjusting, by the coprocessor, brightness of a screen of the terminal according to an identification result, wherein the adjusting comprises:

turning off the screen of the terminal if the coprocessor receives the low-power-consumption-mode image and identifies that there is no predetermined number of consecutive low-power-consumption-mode images that comprise the predetermined characteristic information and the coprocessor detects that the screen of the terminal is in an on state, wherein the predetermined characteristic information includes eye gaze information and facial information, by the coprocessor instructing the application processor to turn off the screen of the terminal by reducing brightness of backlight; and waking up, by the coprocessor, the application processor from a sleep mode and instructing the application processor to light up and turn on the screen of the terminal, when the coprocessor receives the low-power-consumption-mode image and identifies that there are a predetermined number of consecutive low-power-consumption-mode images that comprise the predetermined characteristic information, wherein the predetermined characteristic information includes eye gaze information and facial information.

10. The computer-readable medium according to claim 9, wherein the adjusting, by the coprocessor, brightness of a screen of the terminal according to an identification result comprises:

calculating, by the coprocessor, a current ambient brightness value according to the low-power-consumption-mode image; and when the coprocessor receives the low-power-consumption-mode image and identifies that there are a predetermined number of consecutive low-power-consumption-mode images that comprise the predetermined characteristic information, and the coprocessor detects that the application processor is in a waking state and the screen of the terminal is in an on state, adjusting, by the coprocessor, the brightness of the screen of the terminal according to the current ambient brightness value, wherein a larger ambient brightness value indicates higher adjusted brightness of the screen of the terminal.

* * * * *